United States Patent
Holt et al.

(10) Patent No.: US 12,228,077 B2
(45) Date of Patent: Feb. 18, 2025

(54) FUEL SYSTEM INCLUDING DRIVING TURBINE

(71) Applicant: ROLLS-ROYCE plc, London (GB)

(72) Inventors: Jonathan E. Holt, Derby (GB); Richard Sharpe, Leek (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/183,989

(22) Filed: Mar. 15, 2023

(65) Prior Publication Data

US 2023/0304440 A1     Sep. 28, 2023

(30) Foreign Application Priority Data

Mar. 23, 2022   (GB) ..................................... 2204073

(51) Int. Cl.
  *F02C 7/224*    (2006.01)
  *B64D 13/02*    (2006.01)
  *B64D 37/30*    (2006.01)
  *F02C 7/32*     (2006.01)

(52) U.S. Cl.
  CPC .............. *F02C 7/224* (2013.01); *B64D 13/02* (2013.01); *B64D 37/30* (2013.01); *F02C 7/32* (2013.01); *F05D 2220/323* (2013.01); *F05D 2240/36* (2013.01)

(58) Field of Classification Search
  None
  See application file for complete search history.

(56) References Cited

U.S. PATENT DOCUMENTS

| | | | |
|---|---|---|---|
| 9,346,565 B1* | 5/2016 | Hardy | B64G 1/401 |
| 9,470,218 B2* | 10/2016 | Eowsakul | F04B 39/066 |
| 10,125,692 B2* | 11/2018 | Ernst | F02C 9/28 |
| 11,293,354 B2* | 4/2022 | Herring | F02C 6/08 |
| 2015/0344144 A1 | 12/2015 | Kamath et al. | |
| 2016/0123226 A1* | 5/2016 | Razak | F02C 7/18 60/39.15 |
| 2019/0063334 A1* | 2/2019 | Graham | F02C 7/04 |
| 2019/0233123 A1* | 8/2019 | Sharpe | F02C 6/08 |
| 2019/0233125 A1* | 8/2019 | Knight | F16H 3/08 |
| 2020/0232394 A1 | 7/2020 | Herring | |

(Continued)

FOREIGN PATENT DOCUMENTS

| | | |
|---|---|---|
| EP | 3623604 A1 | 3/2020 |
| EP | 3517436 B1 | 5/2020 |
| EP | 3517438 B1 | 6/2020 |

(Continued)

OTHER PUBLICATIONS

European search report dated Aug. 8, 2023, issued in EP Patent Application No. 23158199.2.

(Continued)

Primary Examiner — Ehud Gartenberg
Assistant Examiner — Jacek Lisowski
(74) Attorney, Agent, or Firm — Shumaker & Sieffert, P.A.

(57) ABSTRACT

Disclosed is a fuel system for a gas turbine engine. The system comprises a fuel pump for fluid communication with a fuel reservoir; a driving turbine for driving the fuel pump; and a source of compressed air flow to drive the driving turbine. The source of compressed air may be the engine core, a dedicated fuel system compressor or the compressor of a cabin blower system.

11 Claims, 2 Drawing Sheets

(56) References Cited

U.S. PATENT DOCUMENTS

2021/0207537 A1 7/2021 Roberge

FOREIGN PATENT DOCUMENTS

| JP | 2003166428 A | 6/2003 |
|----|--------------|--------|
| RU | 2746082 C1 | 4/2021 |
| WO | 2014105325 A1 | 7/2014 |

OTHER PUBLICATIONS

Great Britain search report dated Sep. 20, 2022, issued in GB Patent Application No. 2204073.7.
Response to Extended Search Report dated Aug. 8, 2023, from counterpart European Application No. 23158199.2 filed Oct. 16, 2023, 31 pp.

* cited by examiner

FUEL SYSTEM INCLUDING DRIVING TURBINE

CROSS-REFERENCE TO RELATED APPLICATIONS

This specification is based upon and claims the benefit of priority from United Kingdom patent application number GB 2204073.7 filed on Mar. 23, 2022, the entire contents of which is incorporated herein by reference.

BACKGROUND

Technical Field

Gas turbine engines typically use kerosene fuel which is pumped into a combustion section of an engine for combustion in the presence of compressed air provided into the combustion section from an upstream fan via various compressor stages. The fuel is typically pumped using a low-pressure centrifugal pump and a high-pressure gear pump.

Description of the Related Art

Liquid hydrogen has recently become of interest as a fuel for gas turbine engines but liquid hydrogen presents problems for the existing pumping approaches because of the very low temperature (25 K), low lubricity of liquid hydrogen and the differing mechanical properties compared to kerosene.

Hydrogen-burning rockets use high speed turbo pumps driven by a driving turbine powered by the burning of a small proportion of the hydrogen fuel. These to pump liquid hydrogen. However, these high rotational speeds are likely to preclude the use of traditional driving means such as electric drives and gearboxes.

Cabin blower systems are used to pressurise the cabins of aircraft and to provide de-icing of aircraft wings. Cabin blowers are typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox. A means of varying the speed of the drive delivered to the compressor is also required; it is not desirable for the cabin air flow and pressure to be determined by the particular operating condition of the gas turbine. Therefore a gearing mechanism such as a continuously variable transmission is also provided in the drive path between the accessory gearbox and compressor.

EP3517436B discloses a cabin blower system comprising a compressor and a transmission system including a summing epicyclic gearbox. The summing epicyclic gearbox receives two inputs. The first input is provided mechanically from a first accessory gearbox powered by a shaft from the aircraft engine. The accessory gear box also drives a first electrical machine which converts the mechanical power to electrical power. A power management system interconnects the first electrical machine with a second electrical machine which, in turn is connected to the summing epicyclic gearbox. The second electrical machine converts the electrical power back to mechanical power to provide the second input for the epicyclic gearbox.

The epicyclic gearbox has an output that is a function of the difference between the speeds of the first and second inputs. The second input is a continuously variable positive or negative input which can be used to increase or decrease the mechanical first input as desired and as required by operating conditions.

EP3517438B describes a similar system except that the second input is provided from a second shaft of the aircraft engine which powers a second accessory gearbox which, in turn provides power to the first electrical machine.

As well as operating a blower mode, these known compressors can also be operated in a starter mode where they can be used to start the aircraft engine. In this starter mode, the compressor can be operated in reverse (as an expander) and the second electrical machine can be isolated so that the compressed air drives the epicyclic gearbox which in turn drives the accessory gear box and associated shaft. The shaft can, in turn, drive a compressor within the aircraft engine which facilitates starting of the engine.

There is a need to provide a fuel system for a gas turbine engine that can accommodate the challenges posed by the use of liquid hydrogen fuel.

The present disclosure has been devised with the above considerations in mind.

SUMMARY

According to a first aspect there is provided a fuel system for a gas turbine engine, the system comprising: a fuel pump for fluid communication with a fuel reservoir; a driving turbine for driving the fuel pump; and a source of compressed air flow to drive the driving turbine.

By using compressed air flow to drive a driving turbine which, in turn drives the fuel pump, the present inventors have found that the fuel pump can be operated at rotational speeds high enough to pump liquid hydrogen within a gas turbine engine without the need for traditional drives/gears and without the need for burning fuel to drive the driving turbine.

Optional features will now be described.

In some embodiments, the fuel pump may comprise a turbo pump.

In some embodiments, the system may further comprise a fuel reservoir configured to contain liquid hydrogen. For example, the fuel reservoir may be a cryogenic fuel reservoir e.g. cooled to around −25 K. In some embodiments, the system further comprises cryogenic pipework connecting the fuel reservoir to the fuel pump.

In some embodiments the fuel reservoir is located proximate e.g. adjacent the fuel pump in order to minimise pipework, e.g. cryogenic pipework, between the fuel reservoir and fuel pump.

The source of compressed air may be provided by a compressor.

In some embodiments the fuel system comprises a compressor i.e. there is a dedicated fuel system compressor for generating the compressed air to drive the driving turbine. The fuel system compressor may have a blower mode for the feed of compressed air to the driving turbine.

The fuel system may comprise a fuel system compressor and a fuel system transmission system. The fuel system transmission system may be operatively coupled to a compressor stage within the engine core e.g. operatively coupled to the intermediate- and/or high-pressure compressor of the gas turbine engine. The fuel system transmission system may comprise an epicyclic gearbox such a summing epicyclic gearbox operatively coupled to the intermediate- and/or high-pressure compressor of the gas turbine engine. The fuel system transmission system may comprise a first accessory gearbox operatively coupled between one of the intermediate- or high-pressure compressor of the gas turbine engine and the epicyclic gearbox. The fuel system transmission system may comprise a first electrical machine connected to the first accessory gear box. In other embodiments, the first electrical machine may be connected to a second accessory gearbox which is operatively connected between the other one of the intermediate- or high-pressure compressor of the gas turbine engine and the epicyclic gearbox. The first electrical machine is configured to convert mechanical power to electrical power and to provide the electrical power to a second electrical machine. The second electrical machine is configured to convert the electrical power (from the first electrical machine) to mechanical power for input into the epicyclic gear box. The fuel system may comprise a fuel system power management system to control the transfer of electrical power between the first and second electrical machines. The fuel system power management system may further comprise a power source e.g. a battery. The power source/battery may be used to drive the driving turbine in a start-up mode to achieve sufficient fuel flow for start-up of the gas turbine engine.

The fuel system compressor may additionally have a starter mode where the fuel system compressor acts in reverse as an expander. The compressed air generated in the starter mode may be provided to drive the driving turbine to provide fuel to the fuel pump during start-up of the gas turbine engine. In the starter mode, the fuel system transmission system may transmit mechanical power to a shaft operatively connected to the intermediate- or high-pressure compressor of the gas turbine engine.

In other embodiments, the source of compressed air may be provided from a cabin blower system of an aircraft i.e. the fuel system may comprise a cabin blower bleed line from a cabin blower compressor of the cabin blower system.

In this way, a portion of the compressed air generated by the cabin blower compressor may be diverted to drive the driving turbine. Cabin blower systems are typically sized to accommodate cabin air needs under operating conditions experienced at the top of descent. Under these operating conditions, fuel demand is at a minimum. At operating conditions where fuel demand is higher, the cabin blower system typically has spare capacity which can be effectively utilised to drive the driving turbine through the cabin blower bleed line.

The cabin blower system may comprise a cabin blower compressor and a cabin blower transmission system. The cabin blower compressor may be provided with air from the core compressors or from the engine fan bypass duct.

The cabin blower transmission system may be operatively coupled to a compressor stage of the core of the gas turbine engine, e.g. operatively coupled to the intermediate- and/or high-pressure compressor of the gas turbine engine. The cabin blower transmission system may comprise an epicyclic gearbox such a summing epicyclic gearbox operatively coupled to the intermediate- and/or high-pressure compressor of the gas turbine engine. The cabin blower transmission system may comprise a first accessory gearbox operatively coupled between one of the intermediate- or high-pressure compressor of the gas turbine engine and the epicyclic gearbox. The cabin blower transmission system may comprise first electrical machine connected to the first accessory gear box. In other embodiments, the first electrical machines may be connected to a second accessory gearbox which is operatively connected between the other one of the intermediate- or high-pressure compressor of the gas turbine engine and the epicyclic gearbox. The first electrical machine is configured to convert mechanical power to electrical power and to provide the electrical power to a second electrical machine. The second electrical machine is configured to convert the electrical power (from the first electrical machine) to mechanical power for input into the epicyclic gear box. The cabin blower system may be as described in EP3517438B and/or EP3517436B. For example, the cabin blower compressor may have a blower mode for the feed of compressed air to the cabin blower bleed. It may also have a starter mode where the transmission system transmits mechanical power to a shaft operatively connected to the intermediate- or high-pressure compressor.

In yet further embodiments, the source of compressed air may comprise a core bleed line from the gas turbine engine core. For example, the system may comprise a core bleed line from a compressor stage of the gas turbine engine e.g. a core bleed line from an intermediate pressure compressor and/or a core bleed line from the high-pressure compressor within the gas turbine engine core.

In yet further embodiments, the source of compressed air comprises a mixture of two or more of a dedicated fuel system compressor, a core bleed line and/or a cabin blower bleed line, all of which are described above.

In some embodiments, the fuel system further comprises a fuel evaporator downstream of the fuel pump to evaporate the fuel e.g. liquid hydrogen into a gaseous phase fuel for introduction into the gas turbine engine.

In some embodiments, the fuel system further comprises an exhaust downstream of the driving turbine and upstream of the fuel pump for venting any upstream fuel leakage.

In some embodiments, the fuel system comprises a fuel metering unit for metering flow of fuel to the fuel pump. In some embodiments, the fuel system additionally or alternatively comprises a throttle which may be upstream of the driving turbine to control the flow of compressed air and thus the driving force of the driving turbine which, in turn controls the fuel output of the fuel pump. Alternatively, the throttle may be downstream of the driving turbine to control the output of the driving turbine to the fuel pump.

In a second aspect, there is provided an aircraft comprising a fuel system according to the first aspect. The fuel system may comprise a fuel pump compressor and fuel pump transmission system as described above for the first aspect.

In some embodiments, the aircraft further comprises a cabin blower system, the cabin blower system comprising a cabin blower compressor, the fuel system comprising a cabin blower feed line for channelling compressed air from the cabin blower compressor to the driving turbine. Further details of the cabin bower system may be as described for the first aspect.

In some embodiments, the aircraft comprises an engine core comprising a compressor stage, the fuel system comprising a core bleed line for channelling compressed air from the compressor stage to the driving turbine. The compressor stage may comprise an intermediate- or a high-pressure compressor.

According to a third aspect, there is provided a method of operating a fuel system in a gas turbine engine, the method comprising:
  powering a driving turbine using compressed air;
  providing fuel to a fuel pump from a fuel reservoir; and
  driving the fuel pump using the air-powered driving turbine.

In some embodiments, the fuel is liquid hydrogen.
The pump may comprise a turbo pump.

In some embodiments, the method comprises using a compressor to generate the compressed air for powering the driving turbine.

In some embodiments, the method comprises generating the compressed air to drive the driving turbine using a dedicated fuel system compressor.

The method may comprise driving the fuel system compressor through a fuel system transmission system operatively coupled to a compressor stage within the engine core e.g. with the intermediate- and/or high-pressure compressor of the gas turbine engine. The fuel system transmission system may be as described above for the first aspect.

The method may comprise generating the compressed air to drive the driving turbine using a cabin blower system of an aircraft i.e. the method may comprise channelling compressed air from a cabin blower compressor through a cabin blower bleed line.

The method may comprise driving the blower system compressor through a cabin blower system transmission system operatively coupled to a compressor stage within the engine core e.g. with the intermediate- and/or high-pressure compressor of the gas turbine engine. The cabin blower transmission system may be as described above for the first aspect.

The method may comprise channelling compressed air to the driving turbine through a core bleed line from the gas turbine engine core. For example, the method may comprise channelling compressed air from a compressor stage of the gas turbine engine e.g. through a core bleed line from the intermediate pressure compressor and/or a core bleed line from the high-pressure compressor within the gas turbine engine core.

In some embodiments, the method further comprises evaporating the fuel downstream of the fuel pump into a gaseous phase fuel for introduction into the gas turbine engine.

In some embodiments, the method comprises an exhausting any fuel leakage downstream of the driving turbine and upstream of the fuel pump.

In some embodiments, the method comprises metering flow of fuel to the fuel pump. In some embodiments, the method additionally or alternatively comprises a throttling the compressed air upstream of the driving turbine to control the driving force of the driving turbine which, in turn controls the fuel output of the fuel pump.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
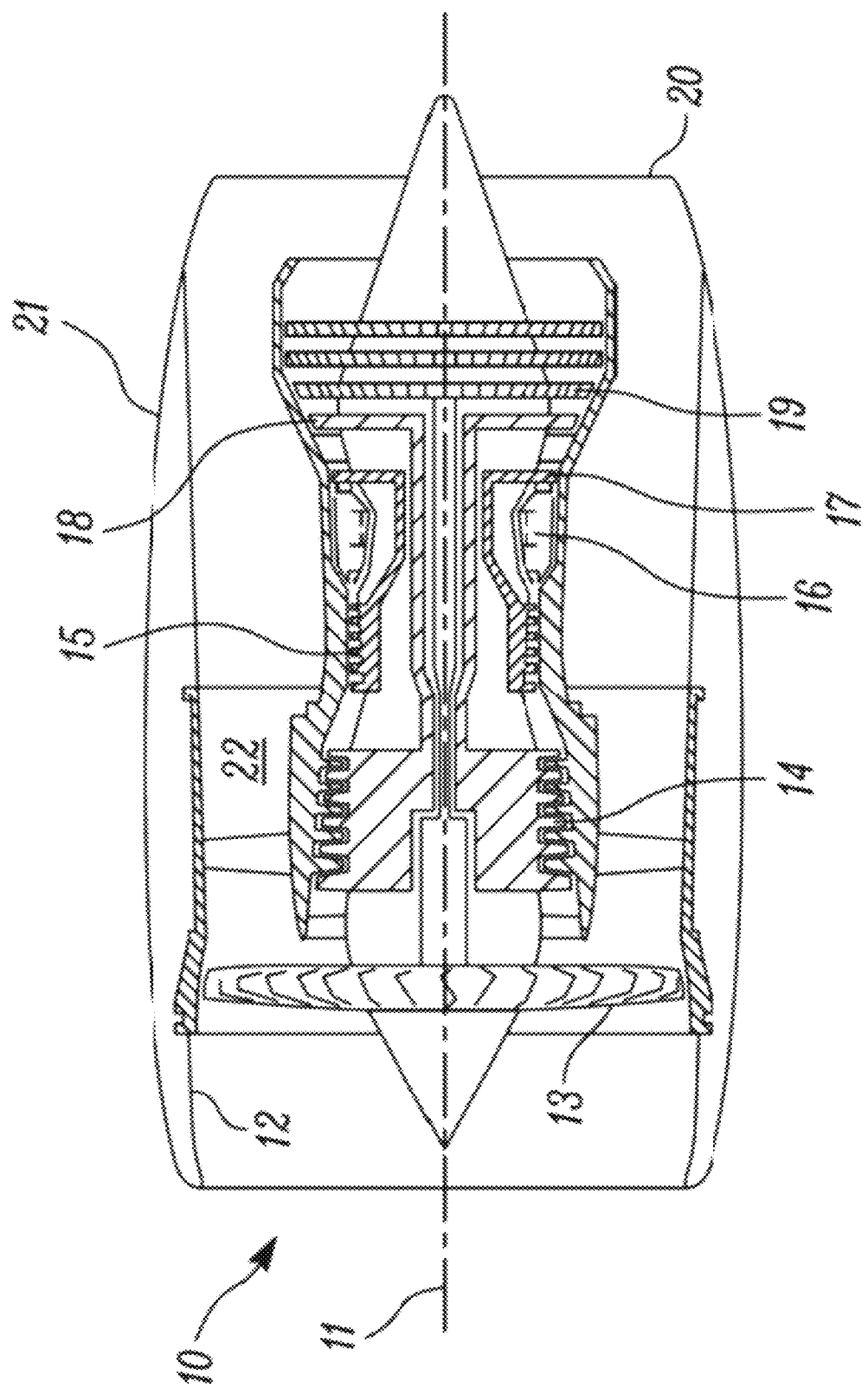
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate-pressure compressor 14, a high-pressure compressor 15, combustion equipment 16, a high-pressure turbine 17, an intermediate-pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate-pressure compressor 14 and a second air flow which passes through a bypass duct 22 to provide propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high-, intermediate- and low-pressure turbines 17, 18, 19 before being exhausted through the nozzle 20 to provide additional propulsive thrust. The high—17, intermediate—18 and low—19 pressure turbines drive respectively the high-pressure compressor 15, intermediate-pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
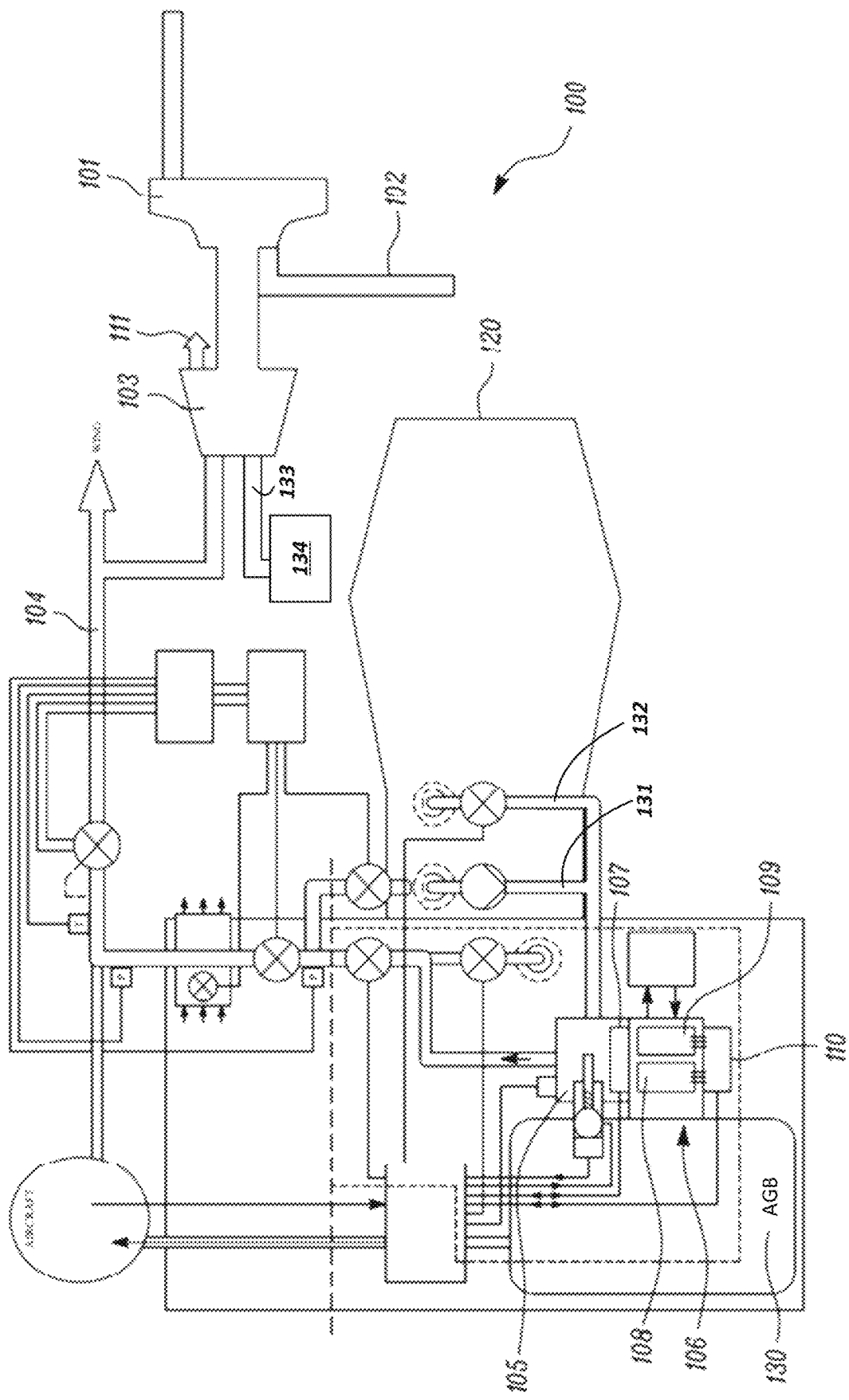
FIG. 2 is a schematic representation fuel system according to an embodiment of the present disclosure.

FIG. 2 shows a fuel system 100 for a gas turbine engine 10. The system comprises a fuel pump 101 for fluid communication with a cryogenic fuel reservoir (not shown) via a cryogenic pipework 102. A driving turbine 103 for driving the fuel pump 101 is provided upstream of the fuel line 102. The fuel pump 101 is a turbo-pump.

The driving turbine 103 is powered by compressed air flow within an airflow channel 104 generated by a fuel system compressor 105 and a fuel system transmission system 106. The fuel system transmission system 106 is operatively coupled to a compressor stage within the engine core 120. The fuel system transmission system 106 comprises a summing epicyclic gearbox 107 operatively coupled to the intermediate- and/or high-pressure compressor 14, 15 of the gas turbine engine core 120. The fuel system transmission system 106 comprises a first accessory gearbox 130 operatively coupled between one of the intermediate- or high-pressure compressor 14, 15 of the gas turbine engine core 120 and the summing epicyclic gearbox 107 to provide a first mechanical input into the summing epicyclic gearbox 107.

The fuel system transmission system 106 comprises a first electrical machine 108 connected to the first accessory gear box 130. The first electrical machine 108 is configured to convert mechanical power from the first accessory gear box 130 into electrical power. The first electrical machine 108 is configured to provide this electrical power to a second electrical machine 109 which is configured to convert the electrical power (from the first electrical machine 108) to mechanical power to provide a second mechanical input into the epicyclic gear box 107.

The fuel system also comprises a fuel system power management system 110 to control the transfer of electrical power between the first and second electrical engines 108, 109.

The summing epicyclic gearbox 107 has an output that is a function of the difference between the speeds of the first and second inputs. The second input is a continuously variable positive or negative input (as a result of the control by the power management system 110) which can be used to increase or decrease the compressed air output of the fuel system compressor 105 as desired and as required by operating conditions.

In addition, a first core bleed line 131 channels compressed air from the intermediate pressure compressor 14 in the gas turbine engine into the compressed air flow channel 104. A second core bleed line 132 channels compressed air from the high-pressure compressor 15 in the gas turbine engine into the compressed air flow channel 104.

In other embodiments, the source of compressed air may additionally or alternatively be provided from a cabin blower system of an aircraft i.e. the fuel system may comprise a cabin blower bleed line 133 from a cabin blower compressor 134 of the cabin blower system.

The cabin blower compressor may be provided with air from the core compressors (as shown in FIG. 2) or from the engine fan bypass duct.

By using compressed air flow from the fuel system compressor 105 and from the first and second core bleed lines to drive a driving turbine 103 which, in turn drives the fuel pump 101, the fuel pump 101 can be operated at rotational speeds high enough to pump liquid hydrogen within the gas turbine engine without the need for traditional drives/gears and without the need for burning fuel to drive the driving turbine. Any upstream leakage of hydrogen to the driving turbine 103 can be exhausted from the driving turbine 103 along with the compressed air via an exhaust 111.

A throttle (not shown) is provided in the compressed air flow channel 104 to vary the volume/flow rate of the compressed air flow and thus control the driving power of the driving turbine 103 (and thus the output of the fuel pump 101). Such a throttle can negate the need for a fuel metering system.

The summing epicyclic gearbox 107 can also be used to reverse the fuel system compressor 105 from a blower mode to a start-up mode in which air from the reversed compressor 105 can still be used to drive the driving turbine 103 and allow operation of the fuel pump during start-up. In addition, isolation of the second electrical machine 109 allows the reversed compressor 105 to drive first accessory gearbox and, in turn, the operatively coupled engine core compressor 14, 15 to assist in engine start up.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A gas turbine engine comprising a fuel system, the gas turbine comprising a core compressor configured to provide core air flow to a combustor and a core turbine; the fuel system comprising:
   a fuel pump for fluid communication with a fuel reservoir;
   a driving turbine for driving the fuel pump; and
   a source of compressed air flow to drive the driving turbine, the source of compressed air flow comprising a cabin blower bleed line from a cabin blower compressor of a cabin blower system.

2. A system according to claim 1, wherein the fuel pump comprises a turbo pump.

3. A system according to claim 1, further comprising a cryogenic fuel reservoir.

4. A system according to claim 1, wherein the system comprises a fuel system transmission system, the fuel system transmission system operatively coupled to a compressor stage within the engine core.

5. A system according to claim 1, wherein the fuel system comprises a core bleed line from a compressor stage of the core of the gas turbine engine.

6. A system according to claim 1, further comprising a fuel evaporator downstream of the fuel pump to evaporate the fuel for introduction into the gas turbine engine.

7. A system according to claim 1, further comprising an exhaust downstream of the driving turbine and upstream of the fuel pump for venting any upstream fuel leakage.

8. A system according to claim 1, further comprising a throttle upstream or downstream of the driving turbine.

9. An aircraft comprising a fuel system according to claim 1.

10. A system according to claim 1, wherein the driving turbine is configured to receive compressed air from a dedicated fuel system compressor, a core bleed line from a compressor stage of the gas turbine engine, or the cabin blower bleed line from the cabin blower compressor of the cabin blower system.

11. A system according to claim 3, wherein the cryogenic fuel reservoir is configured to contain liquid hydrogen.

* * * * *